United States Patent [19]

Di Rosa

[11] 4,197,065
[45] Apr. 8, 1980

[54] SYSTEM FOR FEEDING RAW ELASTOMER PRODUCTS TO VULCANIZING AUTOCLAVES

[75] Inventor: Gaetano Di Rosa, Pino Torinese, Italy

[73] Assignee: F.A.T.A. - Fabbrica Apparacchi di Sollevamento e Trasporto ed Affini S.p.A., Turin, Italy

[21] Appl. No.: 919,108

[22] Filed: Jun. 26, 1978

[30] Foreign Application Priority Data

Aug. 12, 1977 [IT] Italy .............................. 68855 A/77

[51] Int. Cl.² ............................................. B29H 5/02
[52] U.S. Cl. ................................... 425/34 A; 425/38; 425/62; 425/88
[58] Field of Search ....................... 425/38, 88, 29, 30, 425/34, 60, 62

[56] References Cited

U.S. PATENT DOCUMENTS

| | | | |
|---|---|---|---|
| 1,882,118 | 10/1932 | Cherry | 425/38 |
| 1,931,638 | 10/1933 | Abbott | 425/38 X |
| 2,124,613 | 7/1938 | Erickson | 425/38 X |
| 3,550,196 | 12/1970 | Gaguit | 425/38 X |
| 3,724,979 | 4/1973 | Maringer et al. | 425/88 |
| 3,859,021 | 1/1975 | Kleifer | 425/88 X |
| 3,994,657 | 11/1976 | Minegishi | 425/88 X |
| 4,131,402 | 12/1978 | Pirovano | 425/38 |

FOREIGN PATENT DOCUMENTS 802014 9/1958 United Kingdom ....................... 425/38

*Primary Examiner*—J. Howard Flint, Jr.
*Attorney, Agent, or Firm*—Sughrue, Rothwell, Mion, Zinn and Macpeak

[57] ABSTRACT

A system for transferring raw covers for motor vehicle pneumatic tires to vulcanizing autoclaves arranged in at least one row thereof from an overhead conveyor having a plurality of trolleys each carrying one raw cover, comprising a secondary conveyor branch of the overhead conveyor, onto which the trolleys can be diverted to a wait unloading, and a transfer mechanism comprising a plurality of transfer devices running on an overhead track system and each having a support column suspended from a trolley which runs on the track, the support column serving to guide a first frame for vertical displacement and the first frame itself supporting and guiding a second frame for horizontal movement, the second frame carrying at least one gripper device at the end of an arm which is rotatable about its longitudinal axis to position the gripper device pointing upwardly, in which position it is able to remove a cover from a trolley, or downwardly, in which position it is able to deliver the cover to the selected autoclave to which it is conveyed by the transfer device itself.

7 Claims, 14 Drawing Figures

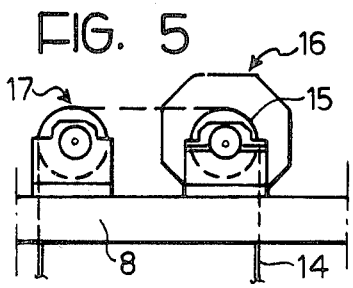
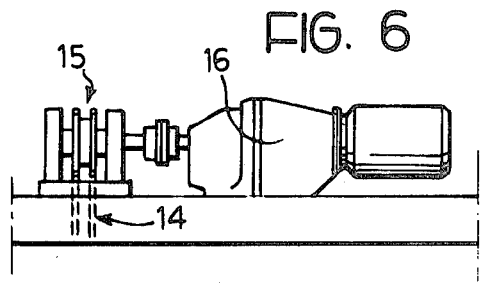
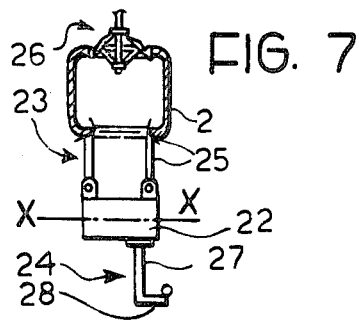
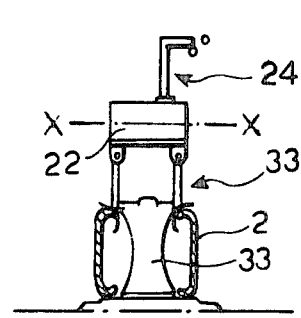
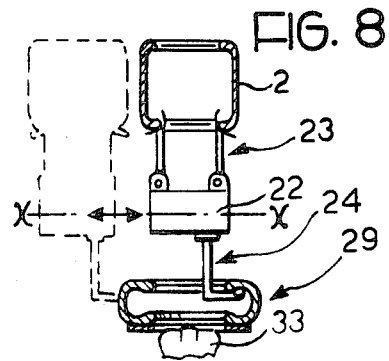
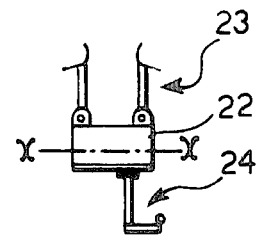
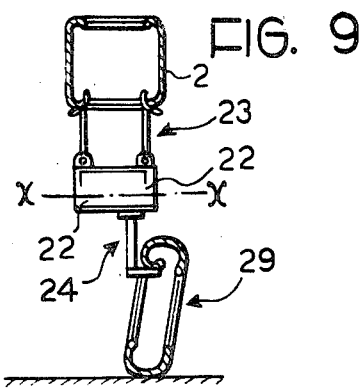

SYSTEM FOR FEEDING RAW ELASTOMER PRODUCTS TO VULCANIZING AUTOCLAVES

The present invention relates to a system for feeding raw elastomer products to vulcanising autoclaves and has particular utility in connection with installations for the production of the covers of pneumatic tires for motor vehicles.

In such installations it is necessary to transfer the covers, which are transported in a raw or "green" state by overhead conveyors from the assembly bay, into position between the vulcanising dies of the vulcanising bay.

At present the transferring of raw covers to the interior of the vulcanising dies is carried out manually, sometimes aided with mechanical auxiliary transfer means located at each autoclave such as, for example a roller stand, a jib crane, a lifting platform, or other such devices equipped or adapted to perform such functions. These auxiliary mechanical means have the disadvantage of nevertheless requiring the manual intervention of an operator who has to expend a considerable amount of energy.

The technical problem which the present invention seeks to solve is to produce a system by means of which the transfer of raw motor vehicle tire covers from an overhead conveyor to a position between the dies of the vulcanising autoclaves can be effected with ease and at a high rate of production and without requiring the use of the said mechanical auxiliary transfer means at each autoclave.

According to the present invention there is provided a system for transferring raw covers for motor vehicle pneumatic tires from trolleys of an overhead conveyor to selected autoclaves of a group of vulcanising autoclaves aligned in at least one row, in which the overhead conveyor has at least one secondary closed loop conveyor branch the guides of which are provided with means for arresting trolleys diverted from the main branch of the overhead conveyor onto the said secondary conveyor, and parallel to the length of the said row of autoclaves there are guides of a further conveyor track along which is displaceable a transfer device which can move along the said further conveyor track from a position adjacent the trolleys on the said secondary closed loop conveyor branch to a position adjacent a selected autoclave of the row, the transfer device having gripping means for holding covers, and being operable to remove a raw cover from a trolley at rest on the secondary closed loop conveyor branch, to carry it to a position in register with a selected autoclave of the row and to position it onto a vulcanising die of this autoclave.

In a preferred embodiment of the invention the transfer device comprises a support trolley mounted for displacement along the said further conveyor track, which latter is located at substantially the same level as the guides of the secondary closed loop conveyor branch of the overhead conveyor, a guide column suspended from the said trolley and extending substantially vertically downwardly therefrom; a first displaceable frame mounted for displacement up and down the said guide column; a second displaceable frame mounted on the said first frame and displaceable substantially horizontally with respect thereto; at least one expandable gripping assembly, for gripping the covers, carried by the said second frame, and drive means operable to effect the displacement of the support trolley and the said first and second frames, and the expansion and contraction of the gripping assembly.

Various embodiments of the invention will now be more particularly described, by way of example, with reference to the accompanying drawings, in which:

FIGS. 5 and 6 illustrate two component parts of the transfer device shown in FIGS. 3 and 4;

FIGS. 7 to 11 illustrate various successive working stages of the transfer device illustrated in FIGS. 3 to 6;

Figure 1:
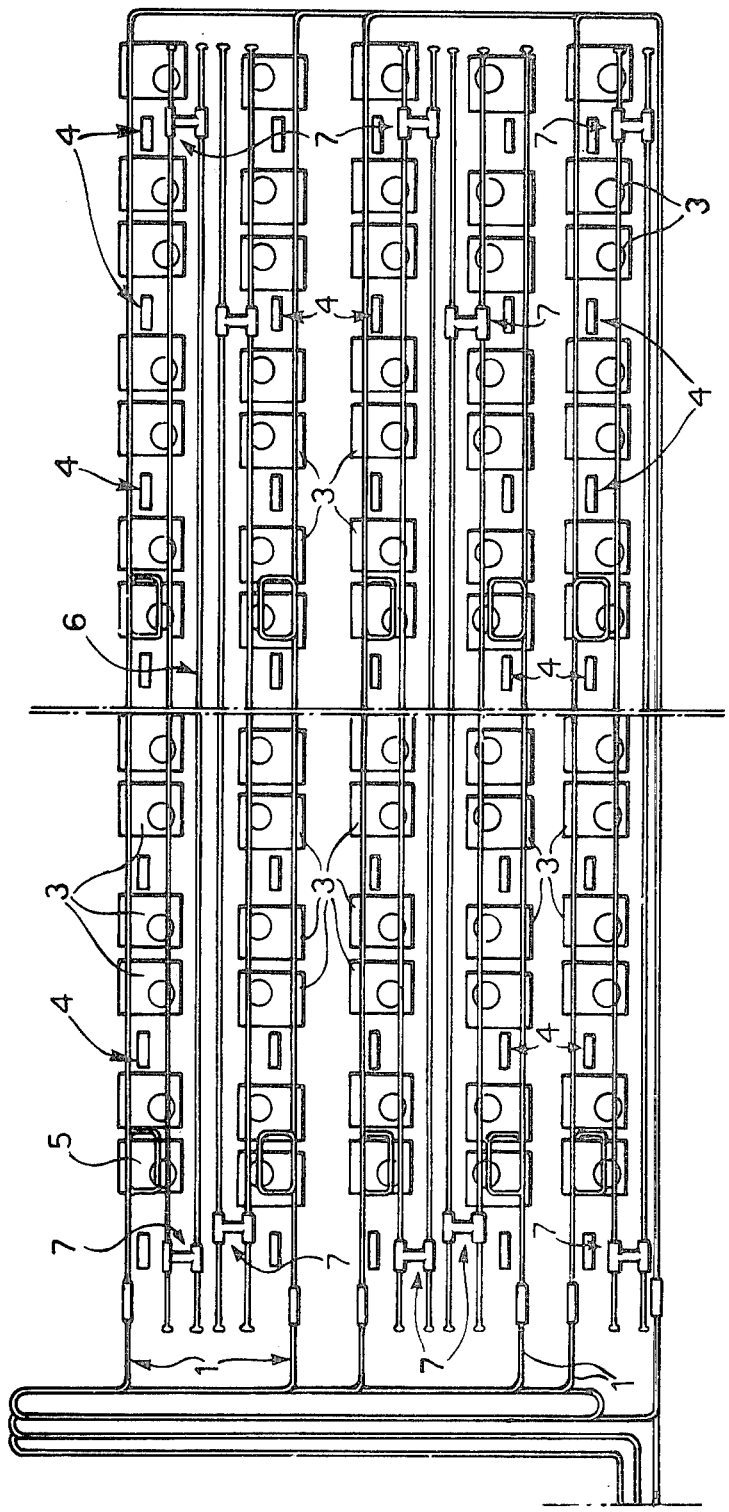
FIG. 1 is a plan view of a system for the transfer of motor vehicle tire covers in a plant for the production of pneumatic tires for motor vehicles.
Figure 2:
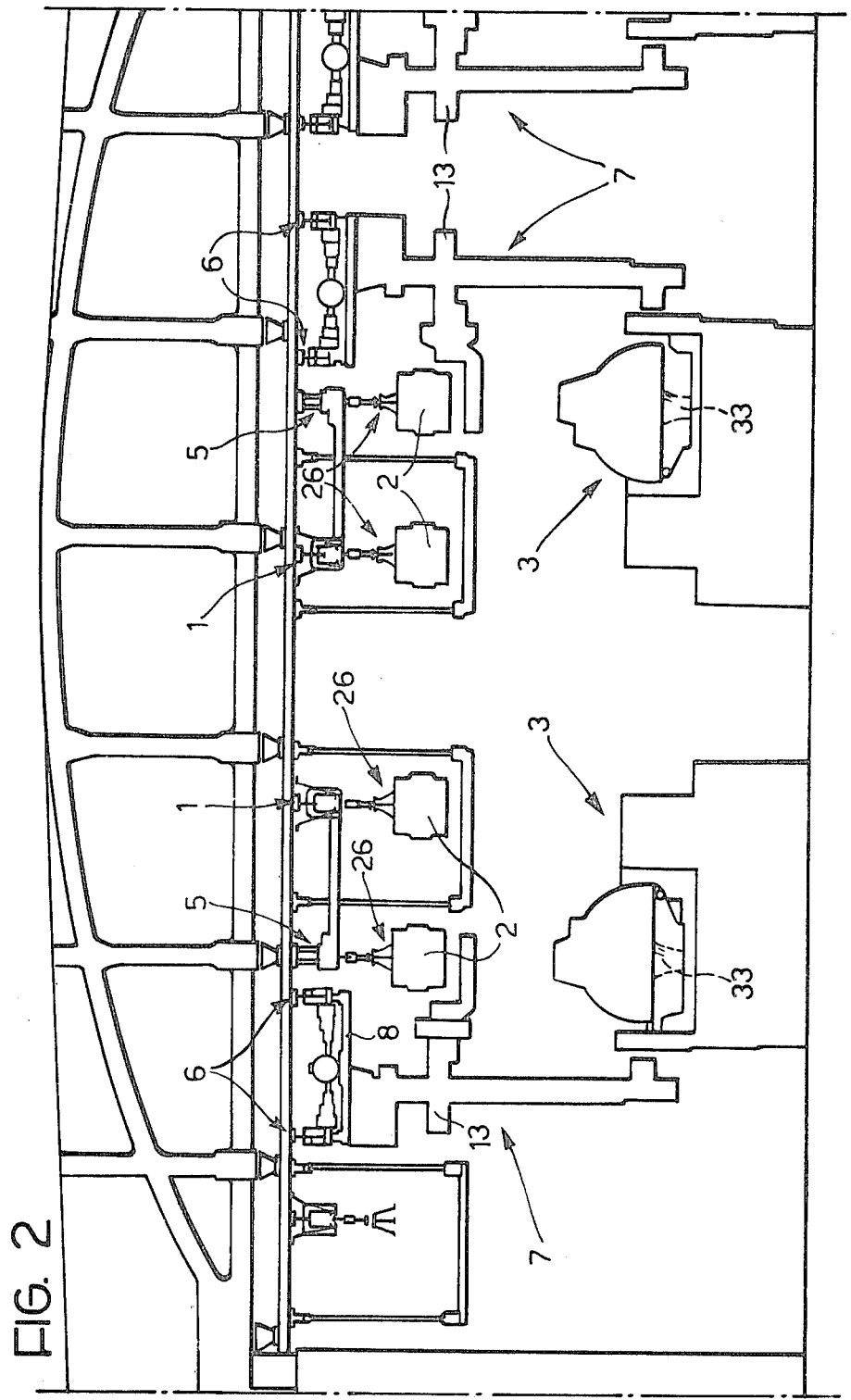
FIG. 2 is a diagrammatic cross sectional view of part of the plant shown in FIG. 1.

Referring first to the embodiment illustrated in FIGS. 1 to 11, there are shown a plurality of overhead conveyors 1 of twin track type which serve to transport pneumatic tyre covers 2 in an installation for their production. This installation is partially illustrated in FIG. 1 which represents the vulcanising bay to which the covers 2 are fed, by overhead conveyors 1, in their raw state having come from an assembly bay (not shown). As can be seen in FIG. 1 the vulcanising bay comprises a plurality of vulcanising autoclaves 3 aligned in parallel rows and grouped in pairs in each row; between each pair in each row there are placed cooling units 4. Each overhead conveyor 1 feeds a corresponding row of vulcanising autoclaves 3 and with each such row there is associated a closed loop secondary overhead conveyor branch 5.

Each secondary conveyor branch 5 has guides which are provided, in a known way, with means for arresting the trolleys, which can be diverted from the main branch of the overhead conveyor 1 onto said secondary conveyor branch 5, at suitable positions for feeding the covers 2, which are transported by these trolleys, into pairs of vulcanising autoclaves 3 and their associated cooling units 4 as will be described below.

Parallel to each row of vulcanising autoclaves 3 there are located guides 6, situated at substantially the same level as the secondary conveyors 5. On each of the guides 6 are mounted, slidably, three transfer devices 7, each of which is associated with a corresponding secondary conveyor branch 5.

Figure 4:
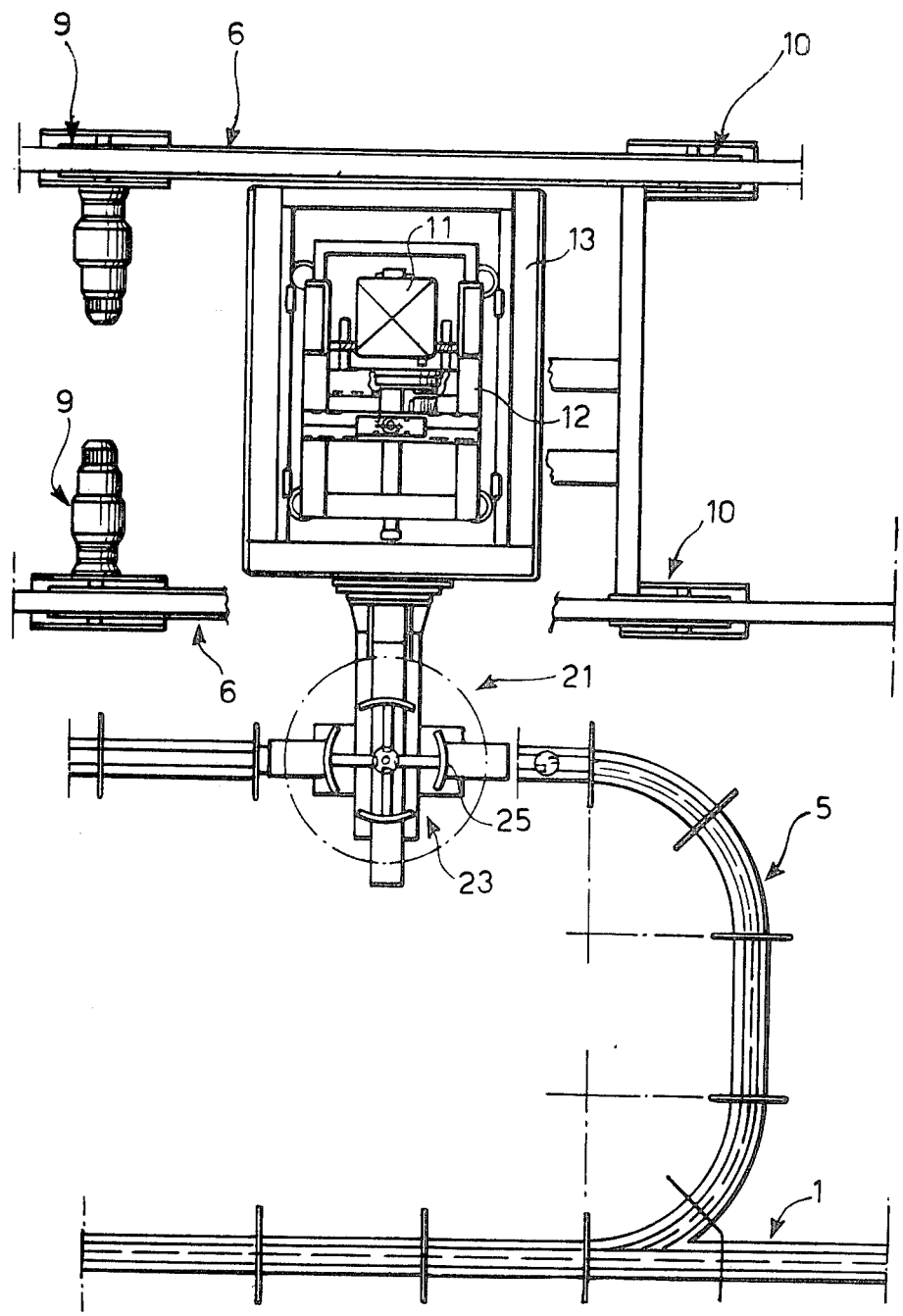
FIG. 4 is a plan view of the transfer device shown in FIG. 3.

As is illustrated in greater detail in FIG. 4 each transfer device 7 comprises a support trolley 8 provided with a pair of driven wheels 9 and a pair of idler wheels 10 which run on the guide 6. Suspended from the support trolley 8 is a guide column 11 extending vertically downwards. On this guide column 11 is mounted, for vertical movement up and down the column, a first movable frame 12 on which is mounted a second movable frame 13 which is displaceable horizontally with respect thereto.

Displacement of the first frame 12 is effected by means of a double chain 14 (see FIGS. 5 and 6) which passes over a first pulley 15, driven to rotate by a geared motor 16, and an idler pulley 17. The chain 14 is anchored at one end to the frame 12 and carries, at the opposite end a counterweight 18.

Figure 3:
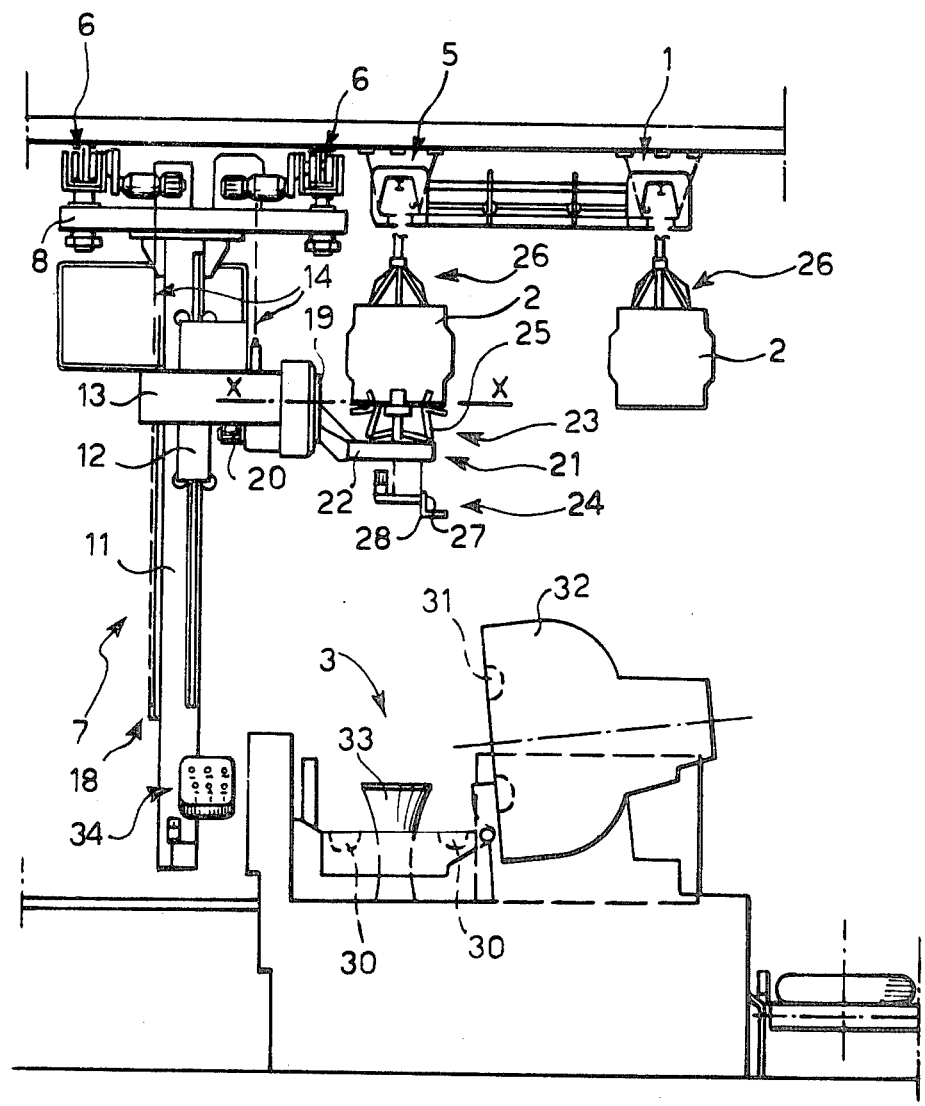
FIG. 3 is a side view of a transfer device used for the transfer of covers.

The second frame 13 carries at one end a rotatable part 19 driven, by a motor 20 via a transmission system which is not illustrated, to turn about a horizontal axis shown as X—X in FIG. 3. Rigidly attached to the rotatable part 19 of the second frame 13 is a gripping assembly, indicated generally by the reference 21, which comprises a central support 22, rigidly attached to the rotatable part 19; to the support 22 is fixed, on one side, an expanding gripper 23 and, on the diametrically opposite side, a hooking member 24.

The expanding gripper 23 is provided with a number of radially displaceable arms 25 shaped to grip from within a tire cover 2 suspended by means of a similar expanding gripper 26 on a trolley of the branch conveyor 5.

The hooking element 24 is generally L-shape having a vertical arm 27 fixed to support 22 and a horizontal arm 28 extending away from the second frame 13 and serving, in use, to engage a vulcanised cover 29 whereby to lift it from a vulcanising autoclave 3, as will be described in greater detail below.

In FIG. 3 can be seen one of the vulcanising autoclaves 3 the construction of which is well known in the art, and which will therefore be described only in outline herein. The autoclave 3 has a fixed die 30 carried on a base, and a movable die 31 incorporated in a hood 32 which can be swung into position over the fixed die 30 or swung back to the open position in which it is shown in FIG. 3. Projecting axially up from the fixed die 30 is a column surrounded by a bladder 33 the interior of which is selectively connectable to a source of compressed air whereby the bladder can be inflated or deflated at will. In use of the autoclave 3, when the hood 32 is swung back, a raw cover 2 may be positioned over the fixed die 30 and the hood 32 closed over it for vulcanisation to take place. The raw covers 2 are in the form of cylinders comprising a central portion which will form the tread portion of the finished cover, and two end portions which project axially away from the centre portion in opposite directions. The open ends of the raw cover 2 are of substantially the same diameter as the bead of the finished cover will be when cured and upon vulcanisation the two rims are brought close to one another by displacement of the movable die 31 towards the fixed die 30 and the centre or tread portion of the cover is displaced radially outwards by this movement and by inflation of the bladder 33.

At the bottom of the column 11 is a control panel 34 for an electronic control system (not shown in the drawings) which controls the transfer device 7 to perform repeatedly the work cycle which will now be described with reference to FIGS. 7 to 11.

As soon as one of the vulcanising autoclaves 3 has completed vulcanisation of a cover therein a call signal is sent to the appropriate transfer device 7 indicating that a vulcanised cover 29 in the autocalve 3 is to be removed and a new raw cover 2 is to be located in its place. The raw covers 2 are suspended from waiting trolleys on the secondary conveyor 5. As illustrated in FIG. 3, the raw covers 2 are suspended with their central axes vertical; the trolley 8 of the transfer device 7 which is nearest the secondary conveyor 5 at this time is driven to a position where the gripper device 23 is located directly underneath the first of the waiting raw covers 2 and the first frame 12 is then raised until the arms 25 of the expanding gripper 23 are introduced, in the retracted position, into the lower rim of the raw cover 2. The arms 25 of the gripper device 23 are then radially expanded (FIG. 7) to engage the raw cover 2 and the arms of the gripper device 26 of the trolley of the overhead conveyor 5 are then radially contracted to release the raw cover 2 for subsequent transfer by the device 7. The first frame 12 is first displaced downwardly sufficiently far to disengage the raw cover 2 from the expanding gripper 26. The trolley 8 is then traversed until it is adjacent that vulcanising autocalve 3 which sent the "ready" signal, and the first frame 12 is displaced downwardly further until the hooking element 24 is introduced in a central position into the vulcanised cover 29, which was vulcanised in the preceding cycle. The second frame 13 is then displaced horizontally so that the hooking element 24 engages under the upper rim of the vulcanised cover, as shown in FIG. 8. The first frame 12 is now partially raised to lift the vulcanised cover 29 from the autoclave 3 as shown in FIG. 9, and then the trolley 8 is traversed to bring it to a position over the adjacent cooling unit 4: when in this position the first frame 12 is lowered to deposit the vulcanised cover 29 into the cooling unit 4 and the trolley is then driven to return the device to the loading position over that vulcanising autoclave 3 from which the vulcanised cover 29 has just been removed. In this position a 180° rotation of the rotating support 22 is effected so that the raw cover 2 is positioned directly over the fixed die 30 of the autoclave 3. The first frame 12 is then lowered again until the raw cover 2 is resting on the fixed die 30 as shown in FIG. 10. After the lower rim of the raw cover 2 has touched the fixed die 30 the displacement of the first frame 12 proceeds for a short distance (of the order of 100 mm) so as to cause a certain flexing of this cover 2, the centre or tread portion being bowed outwardly. The bladder 33 is then inflated and, as soon as it is sufficiently inflated to hold the raw cover 2 fixed in position, the arms 25 of the gripper device 23 are slightly contracted and the first frame 12 is raised to draw the gripper device 23 away from the raw cover 2. The next traverse of trolley 8 moves it to a position adjacent the secondary conveyor branch 5 so that the transfer device 7 is ready to take another raw cover 2 from a trolley suspended therefrom for transfer to the next vulcanising autoclave 3 to complete vulcanisation of a tire cover.

From the above description it will be appreciated how the apparatus of the present invention reduces the necessity for intervention of the operator to a simple controlling function to ensure correct operation of the apparatus.

Figure 12:
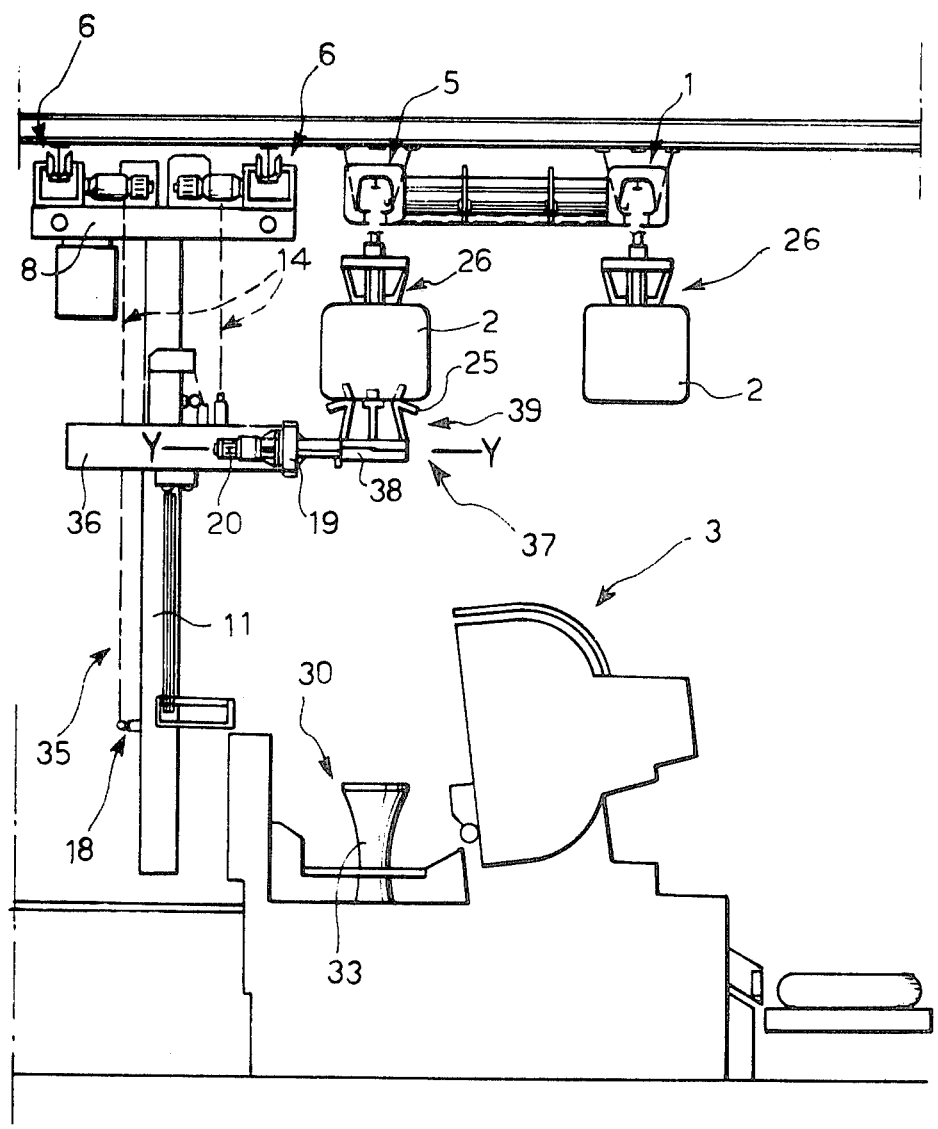
FIG. 12 is a partial and diagrammatic side view of a second embodiment of the invention.
Figure 13:
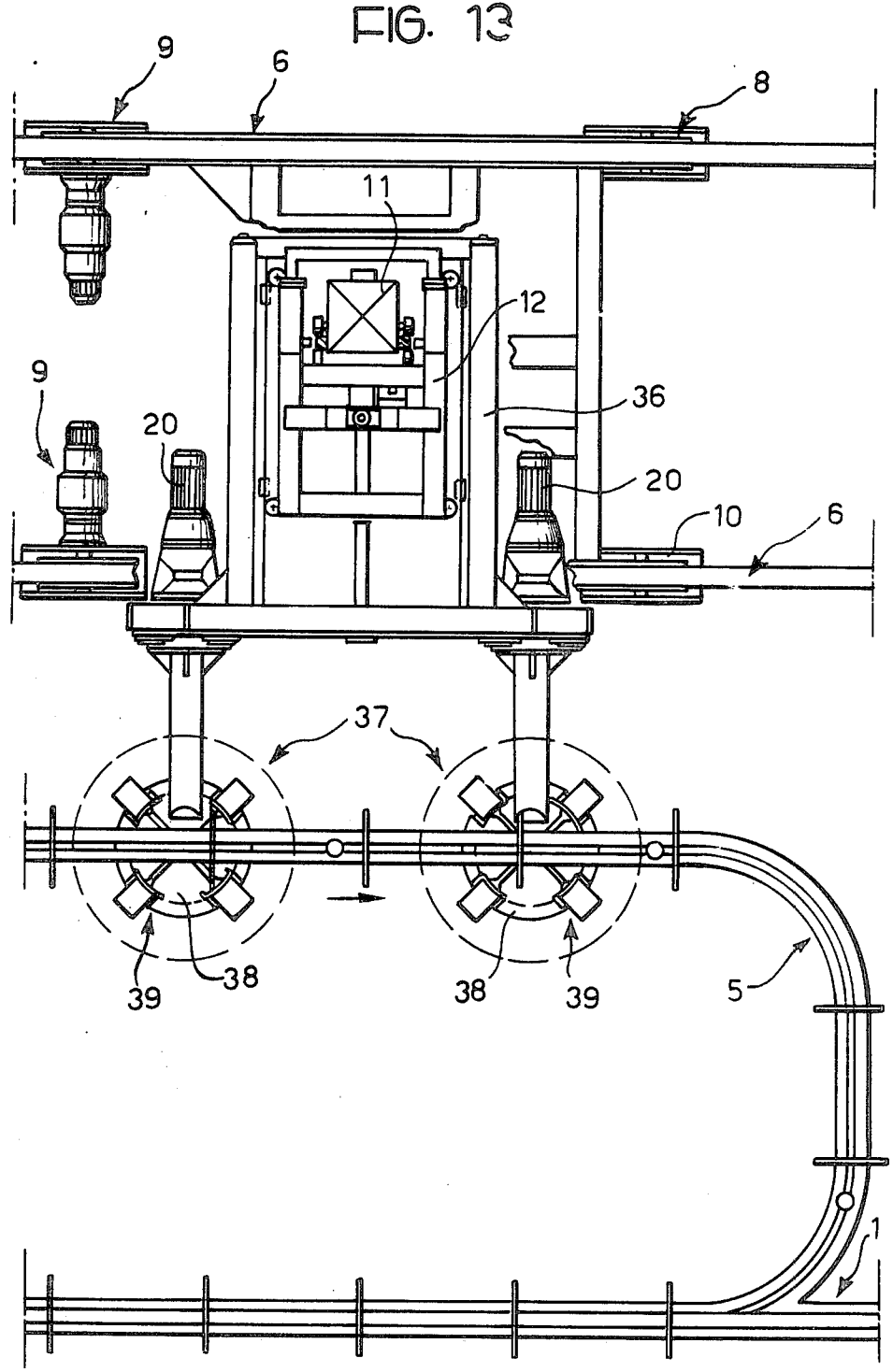
FIG. 13 is a plan view of the components shown in FIG. 12.

In FIGS. 12 and 13 there is shown an alternative embodiment in which those components which are identical with corresponding parts of the embodiment of FIGS. 1 to 11 are indicated with the same reference numerals. The vulcanising autoclaves 3 are exactly the same as before, that is arranged in pairs, and covers 2 are fed in their raw state to pairs of vulcanising autoclaves 3 by a transfer device 35 which is broadly similar to the transfer device 7 of the embodiment of FIGS. 1 to 11, but differs in that it has a second frame 36 similar to the second frame 13 of the embodiment of FIGS. 1 to 11, but provided with a pair of gripping assemblies 37 lying alongside each other, as can be seen in FIG. 13.

Each of the gripping assemblies 37 has a central support 38 which is supported on the second frame 39, and is rotatable about a respective horizontal axis YY. Each support 38 carries an expanding gripper 39 having radially displaceable arms 25 identical with those of the expanding gripper 23 of the transfer device 7 in the embodiment of FIGS. 1 to 11.

The transfer device 35 is controlled by an electronic control system (not illustrated) to perform a cycle of operations in which the removal of raw covers 2 from the secondary conveyor 5 and their subsequent deposition into the autoclaves 3 takes place in exactly the same way as described with reference to FIGS. 7 to 11 with the exceptions that the removal of vulcanised covers 29 from the autoclaves 3 is carried out by another part of the device (not illustrated), and the transfer device 35 operates to deposit two raw covers 2 simultaneously into each vulcanising autoclave 3 of a pair.

Figure 14:
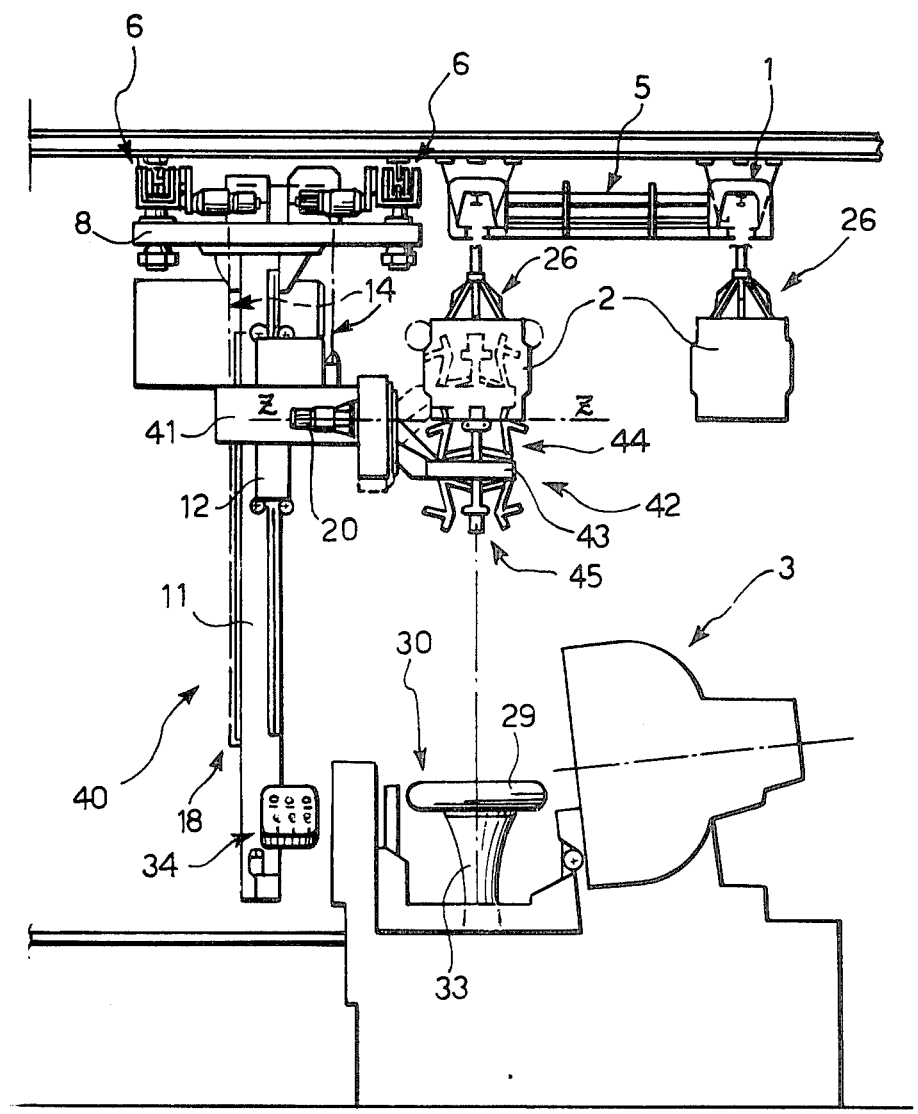
FIG. 14 is a diagrammatic and partial side view of a further embodiment of the invention.

In the embodiment illustrated in FIG. 14 in which, again, component parts which are identical with corresponding parts in the embodiment of FIGS. 1 to 11, are indicated with the same reference numerals, there is shown a transfer device 40 which differs from the transfer device 7 of the embodiment of FIGS. 1 to 11 by the fact that it has a second frame 41 which supports a pair of gripping assemblies 42, each of which has a central support 43 which is carried by the second frame 41 in such a way as to be turnable about a horizontal axis ZZ. To each central support 43 are fixed, in opposite positions, an upper expanding gripper 44 similar to the expanding gripper 23 of the transfer device 7 in the embodiment shown in FIGS. 1 to 11, and a lower expanding gripper 45 identical to the expanding gripper 44 but facing in the opposite direction. By providing each gripping assembly 42 with two expanding grippers 44,45 as described above the transfer device 40 can perform the following cycle of operations.

The transfer of a raw cover 2 from the secondary conveyor 5 to a position over the selected vulcanising autoclave 3 takes place in the same way as previously described with reference to the embodiment of FIGS. 1 to 11 except, of course, that two covers are transferred at a time. After each gripping assembly 42 has been carried to a position over a cover 29 which was vulcanised in the preceding cycle, the first frame 12 is lowered sufficiently far for the retracted arms of the two gripper devices 45 to be introduced into the pair of vulcanised covers 29. The subsequent expansion of the arms of the two gripper devices 45 causes them to grip the two vulcanised covers 29 which are then drawn off the die of each vulcanising autoclave 3 when the first frame 12 is raised slightly. The rotating support 43 of each gripping assembly 42 is then made to rotate through 180° and the first frame 12 is again lowered to deposit the two raw covers 2 onto the fixed die 30, surrounding the bladder 33 as described above in relation to the embodiment of FIGS. 1 to 11. The first frame 12 is again raised and the trolley 8 is made to traverse until each gripping assembly 42 is directly above a cooling unit (not shown). The first frame 12 is again lowered in such a way as to introduce the now retracted arms of the two gripper devices 44 into the two covers which have been cooling therein during the preceding cycle. The two gripper devices 44 are then expanded to grip these covers which are then withdrawn from the cooling unit by a partial elevation of the first frame 12. Following this a 180° rotation of the gripping assembly 42 takes place so that the two gripper devices 45 are brought to the lower position whereby to allow deposition into the cooling unit of the two vulcanised covers removed from the vulcanising autoclave 3. When the vulcanised covers have been thus deposited the arms of gripper devices 45 are in the retracted state and projecting downwardly and the transfer device 40 is then returned to a position adjacent to a waiting trolley on the secondary conveyor 5. The first frame 12 is then again raised to cause the contracted arms of two gripper devices 26 of this trolley to engage into the centres of the two cooled covers of the preceding cycle carried by the gripper devices 44. The subsequent opening of the arms of these gripper devices 26 followed by the closing of the arms of the gripper devices 44 transfers these covers from the transfer device 40 to the trolley which is then fed back into the main conveyor 1 is a known way (not shown).

Naturally the operating cycles illustrated and described above are of a purely illustrative nature, and other cycles may be performed in relation to the configuration of the gripping devices carried by the transfer device.

What is claimed is:

1. In a system for transferring raw covers for motor vehicle pneumatic tires from trolleys of an overhead conveyor to selected autoclaves of a group of vulcanising autoclaves having respective vulcanising dies and being aligned in at least one row, the improvement wherein:
    said overhead conveyor has at least one closed loop secondary conveyor branch,
    trolleys having means for carring raw covers movably supported on said overhead conveyor,
    means on said closed loop secondary conveyor branch for arresting trolleys diverted from the main branch of said overhead conveyor into said secondary conveyor branch,
    a row of vulcanising autoclaves,
    a further conveyor track extending parallel to the length of said row of autoclaves,
    at least one transfer device displaceable along said further conveyor track from a first position adjacent the arrested trolleys on said closed loop secondary conveyor branch to a second position adjacent any selected autoclave of said row, and
    gripping means on said at least one transfer device for removing,
    a raw cover from a trolley at said first position and depositing said cover onto the vulcanising die of said selected one autoclave upon displacement of said at least one transfer device to said second position.

2. The system of claim 1, wherein said further conveyor track is located at the same level as said closed loop secondary conveyor branch of said overhead conveyor,
    said at least one transfer device comprises:
    a support trolley,
    means mounting said support trolley for displacement along said further conveyor track,
    a guide column suspended from said support trolley and extending vertically downwardly therefrom;
    a first displaceable frame mounted for displacement up and down said guide column;
    a second displaceable frame mounted on said first frame and displaceable horizontally with respect thereto;
    at least one expandable gripping assembly for gripping the covers, said gripping assembly being carried by said second frame, and
    drive means operable to effect displacement of said support trolley and to control movement of said first and second frames, and the expansion and contraction movement of said at least one gripping assembly.

3. The system of claim 2, wherein said at least one gripping assembly comprises:
a rotatable support carried by said second frame for rotation about a horizontal axis, and
a gripper device carried on said rotatable support, and including:
a plurality of arms displaceable between an expanded position and a retracted position in the former of which they can grip the inside of a cover to be transferred.

4. The system of claim 3, wherein said at least one gripping assembly is further provided with a second gripper device identical to the first gripper device, positioned diametrically opposite said first gripper device across the axis of rotation of said rotatable support and directed away from said first gripper device.

5. The system of claim 3, wherein said rotatable support of said gripping assembly carries, in a position diametrically opposite the gripper device across the axis of rotation of the support, a hooking member serving to lift the vulcanised covers from the autoclave in use of the system.

6. The system of claim 5, wherein said hooking member is an L-shape element having a vertical arm fixed to said rotatable support and a horizontal arm projecting away from said second frame.

7. The system of claim 2, wherein said drive means for controlling the movement of said first frame includes:
at least one chain,
means securing one end of said chain to said first frame,
a pulley carried on said support trolley said chain passing over said pulley,
a drive motor carried on said support trolley, said drive motor driving said pulley, and
a counterweight carried at the end of said chain opposite said one end thereof.

* * * * *